(12) United States Patent
Wang et al.

(10) Patent No.: US 11,500,825 B2
(45) Date of Patent: Nov. 15, 2022

(54) TECHNIQUES FOR DYNAMIC DATABASE ACCESS MODES

(71) Applicant: INTEL CORPORATION, Santa Clara, CA (US)

(72) Inventors: Ren Wang, Portland, OR (US); Bruce Richardson, Shannon (IE); Tsung-Yuan Tai, Portland, OR (US); Yipeng Wang, Portland, OR (US); Pablo De Lara Guarch, Shannon (IE)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/105,031

(22) Filed: Aug. 20, 2018

(65) Prior Publication Data
US 2019/0042602 A1 Feb. 7, 2019

(51) Int. Cl.
*G06F 16/21* (2019.01)
*G06F 16/22* (2019.01)

(52) U.S. Cl.
CPC ............ *G06F 16/21* (2019.01); *G06F 16/217* (2019.01); *G06F 16/2255* (2019.01)

(58) Field of Classification Search
CPC .... G06F 16/21; G06F 16/217; G06F 16/2255; G06F 16/2365; G06F 16/00
USPC ........................................................ 707/688
See application file for complete search history.

(56) References Cited

U.S. PATENT DOCUMENTS

| | | | | |
|---|---|---|---|---|
| 8,793,225 | B1* | 7/2014 | Bitincka | G06F 16/2471 707/690 |
| 9,880,933 | B1* | 1/2018 | Gupta | G06F 12/0815 |
| 9,916,354 | B2* | 3/2018 | Konik | G06F 16/25 |
| 2011/0161973 | A1* | 6/2011 | Klots | H04L 47/805 718/104 |
| 2011/0219208 | A1* | 9/2011 | Asaad | G06F 9/06 712/12 |
| 2012/0005406 | A1* | 1/2012 | Hutchison | G06F 12/0246 711/103 |
| 2013/0159603 | A1* | 6/2013 | Whitney | G06F 12/0246 711/103 |
| 2013/0177065 | A1* | 7/2013 | Narasimha | H04L 25/03044 375/234 |

(Continued)

OTHER PUBLICATIONS

Intel Corporation, "Data Plane Development Kit (DPDK)" Retrieved: May 22, 2018 URL: https://www.intel.com/content/www/us/en/communications/data-plane-development-kit.html.

(Continued)

*Primary Examiner* — Hosain T Alam
*Assistant Examiner* — Nicholas E Allen
(74) *Attorney, Agent, or Firm* — KDB Firm PLLC

(57) ABSTRACT

Techniques and apparatus for dynamic data access mode processes are described. In one embodiment, for example, an apparatus may a processor, at least one memory coupled to the processor, the at least one memory comprising an indication of a database and instructions, the instructions, when executed by the processor, to cause the processor to determine a database utilization value for a database, perform a comparison of the database utilization value to at least one utilization threshold, and set an active data access mode to one of a low-utilization data access mode or a high-utilization data access mode based on the comparison. Other embodiments are described.

18 Claims, 9 Drawing Sheets

(56) References Cited

U.S. PATENT DOCUMENTS

| | | | | |
|---|---|---|---|---|
| 2013/0275365 | A1* | 10/2013 | Wang | G06F 16/283 707/602 |
| 2013/0275649 | A1* | 10/2013 | Zhang | G06F 12/1045 711/3 |
| 2014/0250072 | A1* | 9/2014 | Shtilman | G06F 16/275 707/634 |
| 2014/0304275 | A1* | 10/2014 | Baskett | G06F 16/2255 707/747 |
| 2014/0317388 | A1* | 10/2014 | Chung | G06F 9/30145 712/229 |
| 2015/0058832 | A1* | 2/2015 | Gonion | G06F 8/433 717/150 |
| 2015/0178334 | A1* | 6/2015 | Bandyopadhyay | G06F 16/22 707/812 |
| 2015/0186464 | A1* | 7/2015 | Seputis | G06F 16/24539 707/718 |
| 2015/0278725 | A1* | 10/2015 | Mizuta | G06Q 10/0631 705/7.12 |
| 2015/0341941 | A1* | 11/2015 | Nguyen | H04W 72/082 370/332 |
| 2016/0085682 | A1* | 3/2016 | Johnson | G06F 16/9574 707/692 |
| 2016/0147850 | A1* | 5/2016 | Winkler | G06F 16/254 707/602 |
| 2017/0171691 | A1* | 6/2017 | Akyildiz | H04W 24/02 |
| 2018/0012153 | A1* | 1/2018 | Hu | G06Q 10/04 |
| 2018/0014217 | A1* | 1/2018 | Kleinbeck | H04W 24/10 |
| 2018/0139635 | A1* | 5/2018 | Oteri | H04W 74/006 |
| 2018/0189188 | A1* | 7/2018 | Kumar | G06F 3/067 |

OTHER PUBLICATIONS

Dong Zhou, Bin Fan, Hyeontaek Lim, Michael Kaminsky, and David G. Andersen. 2013. Scalable, high performance ethernet forwarding with CuckooSwitch. In Proceedings of the ninth ACM conference on Emerging networking experiments and technologies (CoNEXT '13). Association for Computing Machinery, New York, NY, USA, 97-108. DOI:https://doi.org/10.1145/2535372.2535379.

Bin Fan, Dave G. Andersen, Michael Kaminsky, and Michael D. Mitzenmacher. 2014. Cuckoo Filter: Practically Better Than Bloom. In Proceedings of the 10th ACM International on Conference on emerging Networking Experiments and Technologies (CoNEXT '14). Association for Computing Machinery, New York, NY, USA, 75-88. DOI:https://doi.org/10.1145/2674005.2674994.

Orestis Polychroniou, Arun Raghavan, and Kenneth A. Ross. 2015. Rethinking SIMD Vectorization for In-Memory Databases. In Proceedings of the 2015 ACM SIGMOD International Conference on Management of Data (SIGMOD 15). Association for Computing Machinery, New York, NY, USA, 1493-1508.

Qureshi, Moinuddin & Jaleel, Aamer & Patt, Yale & Steely, Simon & Emer, Joel. (2008). Set-Dueling-Controlled Adaptive Insertion for High-Performance Caching. Micro, IEEE. 28. 91-98. 10.1109/MM.2008.14.

Ross, Kenneth A., "IBM Research Report—Efficient Hash Probes on Modern Processors" RC24100 (W0611-039) Nov. 8, 2006—Computer Science.

* cited by examiner

TECHNIQUES FOR DYNAMIC DATABASE ACCESS MODES

TECHNICAL FIELD

Embodiments herein generally relate to computer processors, and more particularly, to processing data of a database using one of a plurality of data access modes based on at least one characteristic of the database.

BACKGROUND

Processors and/or instruction set architectures are generally configured to access a database according to a certain data access scheme, such as a scalar access scheme or a vectorization access scheme for a hash table database. Developers may determine the access scheme based on various factors in an effort to improve performance. An example factor may include facilitating parallel processing of data to decrease the resources required to perform multiple database instructions. Certain data access schemes may not be optimal under various database operating conditions. However, the data access scheme of a conventional processor system is static and unable to change to adapt to different database operating conditions.

DETAILED DESCRIPTION

Figure 1:
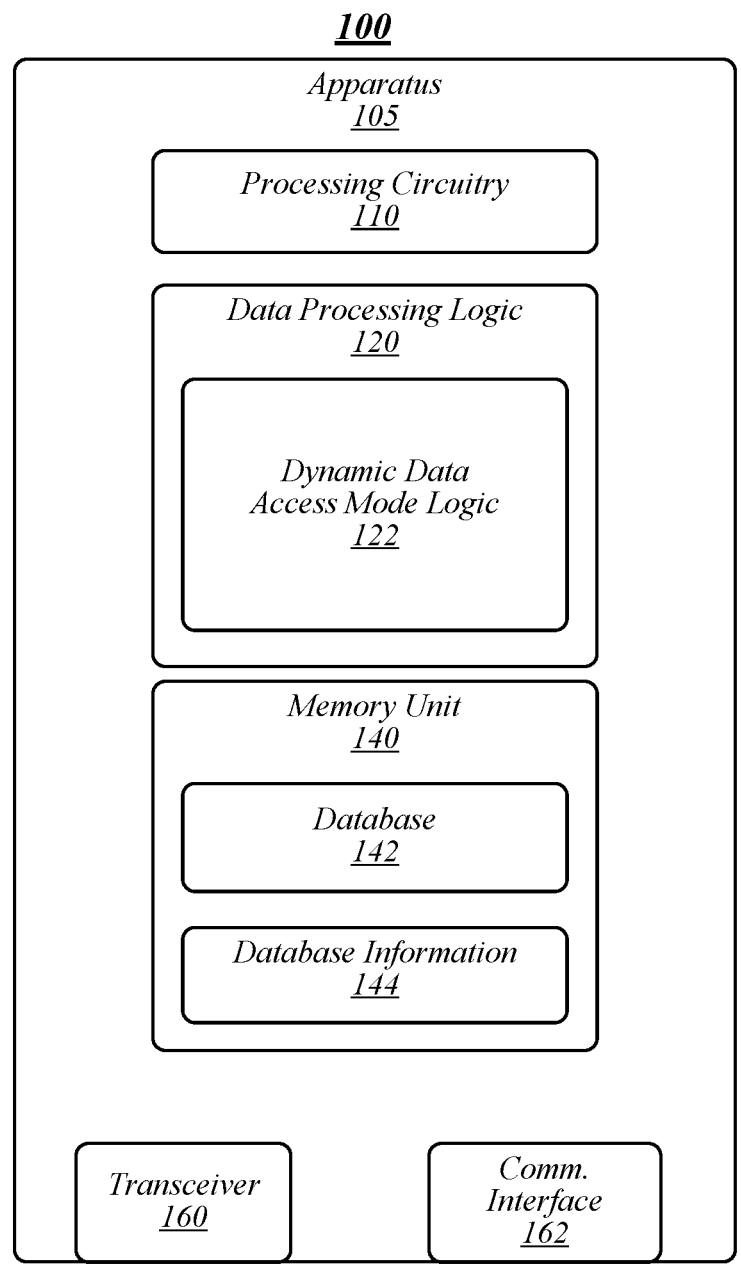
FIG. 1 illustrates an embodiment of a first operating environment.

Various embodiments may be generally directed to techniques for dynamic data processing of a database based on at least one operating condition of the database. In some embodiments, the database may be or may include a hash table. In various embodiments, data processing may include scalar data processing and/or vectorized data processing, such as horizontal vectorization, vertical vectorization, variations thereof, combinations thereof, and/or the like. In some embodiments, the at least one operating condition may include a utilization of a database, for instance, indicating a fullness of the database. In various embodiments, a data access process may operate to monitor the utilization of a database. If the utilization of the database is below a first threshold, the data access process may use a low-utilization data access mode, and if the utilization is above a second threshold, the data access may use a high-utilization data access mode. For example, a processor may be configured to perform database operations via one of a scalar mode or a vectorization mode (for instance, a horizontal vectorization mode). If the utilization of the database is below a low threshold value (for instance, 10% utilization), the data access process may use the low-utilization data access mode. If the utilization of the database is above a high threshold value (for instance, about 20%), the data access process may use the high-utilization data access mode.

In some embodiments, the high-utilization data access mode may involve parallel processing and the low-utilization data access mode may include singular processing (for instance, processing in a one-by-one scheme). In some embodiments, singular processing may include a scalar process and/or vertical vectorization as known to those having skill in the art. In various embodiments, parallel processing may include horizontal vectorization as known to those having skill in the art (for example, as implemented or similar to as implemented in DPDK, Release 18.05). In general, the high-utilization data access mode may be more efficient when the utilization of the database is high (or above a high threshold) and the low-utilization data access mode may be more efficient when the utilization of the database is low (or below a low threshold). The efficiency comparison between a high-utilization data access mode and a low-utilization data access mode may be based on one or more efficiency factors, such as time, cycles, resource usage (for instance, memory usage), and/or the like.

In various embodiments, a high-utilization data access mode may include a horizontal vectorization data access mode. In some embodiments, a low-utilization data access mode may include a scalar data access mode or a vertical vectorization data access mode. Although horizontal vectorization, scalar, and vertical vectorization are used as examples in this Detailed Description, embodiments are not so limited, as any type of data access mode that may have different efficiencies or other operational characteristics depending on database utilization is contemplated herein.

In various embodiments, the database may include a hash table. Non-limiting examples of hash tables and/or hash table methods may include set-associative hash table, open-address has table, bucketized hash table, dynamic hash table, multiple hash functions, Cuckoo hash, Hopscotch hash, linear probing, quadratic probing, combinations thereof, variations thereof, and/or the like. Open-address hash table allows constant time key lookups and it is a central data structure for many workloads, such as flow classification for software packet processing, in memory key-value store, high-performance computing (HPC) systems, and/or the like. One example of packet processing may include the data plane development kit (DPDK) which is set of software libraries and drivers that may be used to accelerate user space packet processing for network computing platforms based on processor architecture, such as the Intel® processor architecture (IA). Many optimizations have been proposed to improve different aspects of hash table performance. For example, in DPDK libraries, Cuckoo hashing may be included to improve the maximum efficiency of the hash table utilization. In another example, Intel® Advanced Vector Extensions (AVX) instructions may be used to compare multiple entries within one bucket in one step to improve, among other things, lookup throughput performance. In some embodiments, a processor or architecture used to process the database or hash table may include single-input multiple data (SIMD) extensions.

In the DPDK library, bucketized open-address hash table with multiple entries (or ways) in one bucket (or set) may be employed as a hash table data structure. After computing the hash value for the input key and finding the corresponding bucket, a vector instruction (for example, an AVX instruction) may be used to compare the input key (or its signature)

against multiple entries in the bucket, and a mask bit-map may be returned to indicate which entry is a match (or none). Such a data access scheme may be referred to as "horizontal vectorization," since it compares one key against multiple entries in one bucket (for instance, horizontal across the bucket). In contrast, a conventional "scalar" mode generally involves entries being compared one by one in a loop.

The horizontal vectorization approach may be more efficient and demonstrate improved performance compared with scalar processes, which sequentially compares the key against each entry (for instance, without an AVX instructions). In deployed systems, hash table occupancy varies, so static vectorization methods (either horizontal or vertical) are not optimal under all operating conditions. For example, when a database, such as a hash table, is very lightly loaded and most keys could be aggregate in the first one or few entries, horizontal vectorization may not be optimal since a majority of AVX instruction capacity is wasted. For example, in an AVX-based scheme, 8 entries of 32-bit hash may be compared using one instruction with, for example, from Intel® intrinsic instructions (for instance, Intel AVX, Intel® AVX-512, and/or the like), _mm256_cmpeq_epi32( ) while 16 entries of 16-bit hash may be compared using one instruction with _mm256_cmpeq_epi16 ( ). Since hash table resizing is very expensive, workloads typically initialize with a hash table size that deals with peak load. Therefore, the utilization (or "load factor") may vary greatly depending on the timing and operating conditions of the database.

For horizontal vectorization, with one instruction, an input key (or signature) may be compared with a plurality of keys (or signatures) in a corresponding bucket indicated by the index, in a horizontal fashion. Horizontal vectorization may allow for fast comparison of multiple ways of a hash table bucket. With multiple ways of each bucket, the maximum hash table utilization may show good performance since multiple keys with the same bucket index can be fitted into different entries of the bucket. Therefore, horizontal vectorization lookup may be very efficient as well, when the table is relatively heavily loaded, since one comparison can process the whole bucket. On the other hand, when the load is light (for example, 10% or less), horizontal vectorization may be less efficient because a majority of the elements in the vector may not be filled (for instance, because they are empty entries). Accordingly, vector lanes may be wasted during the comparison.

Figure 7:
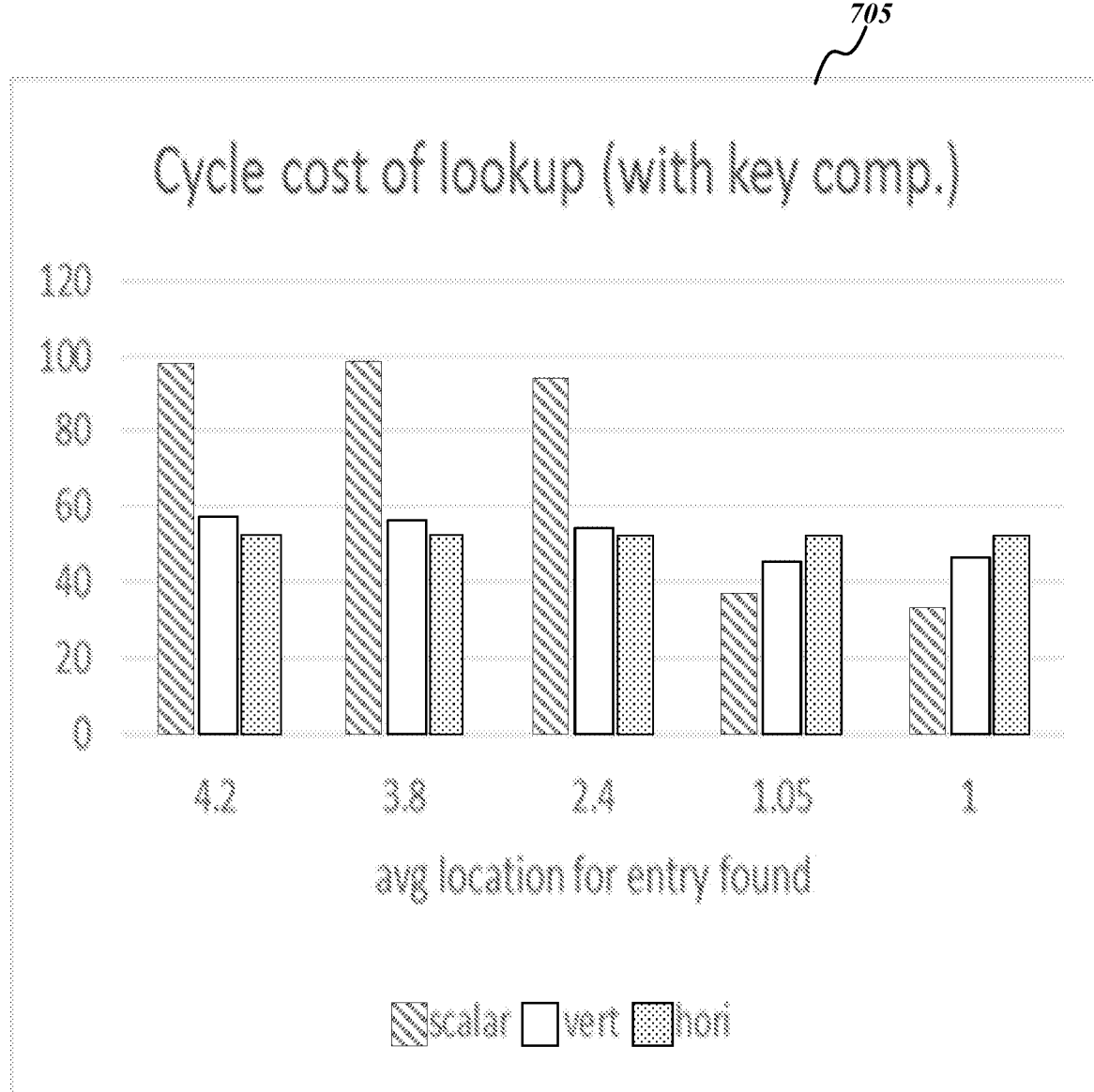
FIG. 7 depicts a graphical representation of experimental results.

Accordingly, in some embodiments, a data access process may include dynamically adapting database access modes based on database utilization (or load factors) to to optimize the performance. For example, when the load factor is high (for instance, above a high threshold), the horizontal vectorization may be most efficient (for instance, as implemented in DPDK for IA). When the load of the data base becomes lighter and there are many empty entries (for instance, when the utilization or load factor is below a low threshold), it may be more optimal to use a different data access mode (for instance, scalar, vertical vectorization, and/or the like) to improve efficiency. Data access processes according to some embodiments provide multiple technological advantages over conventional processes and provide an improvement to computing technology. In a non-limiting example, a technological improvement may allow for more efficient database accesses (for instance, reads, writes, probes, and/or the like). For example, data access processes according to some embodiments may improve throughput performance by at least 30% with lightly loaded hash table over conventional processes (see, for instance, FIG. 7).

In some embodiments, a data access mode may be or may include a high-utilization data access process that has a greater efficiency (for instance, function speed, resource requirements, memory requirements, and/or the like) when the database is full (for instance, utilization above a threshold). In various embodiments, the high-utilization process may include horizontal vectorization. Non-limiting examples of horizontal vectorization may include horizontal vectorization as implemented in DPDK (for instance, DPDK Release 18.08, previous versions thereof, variations thereof, and/or the like), horizontal vectorization as implemented according to K. A. Ross, 2007 IEEE 23rd International Conference on Data Engineering, Istanbul, Turkey 2007, variations thereof, and/or the like. Embodiments are not limited in this context.

In horizontal vectorization, with one instruction, an input key (or signature) may be compared with a plurality of keys (or signature), such as 8 keys in a corresponding bucket indicated by an index in a horizontal fashion (for example, using _mm256_cpcep_epi32 as to compare 8 keys of 32-bit size per SIMD instruction). Horizontal vectorization allows fast comparison of multiple ways of a hash table bucket. With multiple ways of each bucket, the maximum hash table utilization may provide efficient performance since multiple keys with the same bucket index may be fitted into different entries of the bucket. Lookup may also be very efficient, particularly when the table is relatively heavily loaded, since one comparison can process a whole bucket. However, when the load is light (for example, less than or equal to about 10%) horizontal vectorization may be less efficient since a majority of the elements in the vector are not filled (empty entries). Accordingly, vector lanes are wasted during the comparison.

In some embodiments, another vectorization approach may include vertical vectorization. A non-limiting example implementation of vertical vectorization may be the same or similar to as described in Orestis Polychroniou, Arun Raghavan, and Kenneth A. Ross. 2015, "Rethinking SIMD Vectorization for In-Memory Databases," Proceedings of the 2015 ACM SIGMOD International Conference on Management of Data (SIGMOD '15), ACM, New York, N.Y., USA (2015) and variations thereof. In vertical vectorization, a hash table may only have one entry per bucket, and the vectorization lookup compares multiple input keys per AVX instruction against keys in multiple buckets, for example, by using AVX gather instruction to access those buckets. Vertical vectorization may allow looking up of multiple input keys in one SIMD batch. However, hash tables with single-entry buckets, which are similar to one-way direct mapped cache, typically have severe utilization issues due to hash collision. Moreover, this approach involves gather and scatter AVX operations, which are rather expensive in terms of cycle count on many architectures, such as IA. In some embodiments, a low-utilization data access mode may be or may include vertical vectorization.

For a hash table, load factor (or utilization) may vary greatly greatly depending on timing and operating conditions. Hash table resizing is typically not a good option due to its complexity and overhead. When a hash table is heavily loaded, comparing one input key against multiple entries in one bucket (for instance, via horizontal vectorization) may be efficient (for example, avoiding the use of gathering instructions, which may be resource intensive. However, when the utilization of a hash table is low and very few entries are occupied in a bucket, horizontal vectorization is less effective since there will be wasted AVX capacities (for instance, wasted vector lanes during comparison). In such cases, embodiments may dynamically switch to vertical vectorization (or scalar) mode to perform more efficient comparison. Due to the cost of gather/scatter and other necessary operations to manage the results after lookup, vertical mode may actually perform worse than the scalar when the utilization is low. Accordingly, the choice of data access mode may depend on underlying architecture considerations. Processes according to some embodiments may be applied to conventional hash tables and variations thereof, such as a Cukoo-based hash table.

In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

FIG. 1 illustrates an example of an operating environment 100 that may be representative of various embodiments. The operating environment 100 depicted in FIG. 1 may include an apparatus 105 having a processing circuitry 110, a memory unit 140, a transceiver 160, and a communications interface 162. Apparatus 105 may be or may include various types of logic devices, such as a computing device, such as a laptop computer, a personal computer (PC), a workstation computer, a tablet, a personal digital assistant (PDA), a smartphone, a phablet, a server, a networking device, a router, a switch, a hub, virtual implementations thereof (for instance, a virtual switch, and/or the like), and/or the like.

Processing circuitry 110 may include and or may access logic having instructions for performing operations according to some embodiments. Processing circuitry 110 may be communicatively coupled to memory unit 140, transceiver 160, and/or communications interface 162. In various embodiments, processing circuitry 110 may include a CPU or a GPU. In some embodiments, processing circuitry 110 may be implemented on or as a system-on-a-chip (SoC). In some embodiments, processing circuitry 110 may be implemented as a standalone processor die. Processing circuitry 110 may include one or more processing cores, such as 1, 2, 4, 6, 8, 10, 12, or 16 processing cores. Embodiments are not limited in this context. Processing circuitry 110 may include any type of computational element, such as but not limited to, a microprocessor, a microcontroller, a complex instruction set computing (CISC) microprocessor, a reduced instruction set (RISC) microprocessor, a very long instruction word (VLIW) microprocessor, a virtual processor (for example, a VCPU), or any other type of processor or processing circuit. In some embodiments, processing circuitry 110 may be one or more processors in the family of Intel® processors available from Intel® Corporation of Santa Clara, Calif., such as an Intel® Xeon® processor and/or Intel HD or Iris® graphics processors. Although only one processing circuitry 110 is depicted in FIG. 1, apparatus 105 may include a plurality of processing units. In some embodiments, processing circuitry may include a SIMD architecture, instruction set, and/or the like.

Processing circuitry 110 may include and/or may access various logic for performing processes according to some embodiments. For instance, processing circuitry 110 may include and/or may access data processing logic 120 and/or dynamic data access mode logic 122. Although FIG. 1 depicts data processing logic 120 and dynamic data access mode logic 122, and/or logic or controllers thereof as separate logic structures, embodiments are not so limited, as data processing logic 120 and dynamic data access mode logic 122 may be configured as one or a plurality of logic structures. In addition, data processing logic 120, dynamic data access mode logic 122, and/or logic or controllers thereof may be implemented in hardware, software, or a combination thereof. As used in this application, the terms "logic," "component," "layer," "system," "circuitry," "decoder," "encoder," and/or "module" are intended to refer to a computer-related entity, either hardware, a combination of hardware and software, software, or software in execution, examples of which are provided by the exemplary computing architecture 900. For example, a logic, circuitry, or a layer may be and/or may include, but are not limited to, a process running on a processor, a processor, a hard disk drive, multiple storage drives (of optical and/or magnetic storage medium), an object, an executable, a thread of execution, a program, a computer, hardware circuitry, integrated circuits, a controller, application specific integrated circuits (ASIC), programmable logic devices (PLD), digital signal processors (DSP), field programmable gate array (FPGA), a system-on-a-chip (SoC), memory units, logic gates, registers, semiconductor device, chips, microchips, chip sets, software components, programs, applications, firmware, software modules, computer code, combinations of any of the foregoing, and/or the like.

In some embodiment, a logic (for instance, logics 120, 122, 222, 230, 232, and/or 234) may be instructions in memory (for instance, memory units 140 and/or 240). In various embodiments, although logics may be depicted or described as being individual logic elements, logics may be a part of a one or more combined components (for instance, logics 120 and 122 may be a single logic element). Embodiments are not limited in this context.

In some embodiments, data processing logic 120, dynamic data access mode logic 122, and/or logic or controllers thereof may be arranged within processing circuitry 110; however, embodiments are not so limited. For example, data processing logic 120, dynamic data access mode logic 122, and/or logic or controllers thereof may be located within an accelerator, a processor core, an interface, an individual processor die, and/or the like and may include other components, such as software, firmware, circuitry and/or the like.

Memory unit 140 may include various types of computer-readable storage media and/or systems in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In addition, memory unit 140 may include various types of computer-readable storage media in the form of one or more lower speed memory units, including an internal (or external) hard disk drive (HDD), a magnetic floppy disk drive (FDD), and an optical disk drive to read from or write to a removable optical disk (e.g., a CD-ROM or DVD), a solid state drive (SSD), and/or the like. In various embodiments, memory unit 140 may store a database 142 and/or database information 144.

In some embodiments, data processing logic 120 may operate to process data associated with database 142. In some embodiments, database may include a hash table and data processing logic 120 may operate to perform data operations on hash table 142, including, without limitation, read, write, delete, probe, lookup, search, and/or the like. In various embodiments, data processing logic 120 may be or may include various applications that may use data in database 142, such as a packet processing application (for instance, of a computing device, router, switch, and/or the like), flow classification application, virtual network function application, software defined network application, virtual machine application, and/or the like. Embodiments are not limited in this regard.

Data processing logic 120 may access data in database 142 according to one of a plurality of data access modes based on database information 144 relating to database 142. For example, database information 144 may include utilization information associated with database 142 indicating whether or not database 142 is full (for instance, utilization, hit rate, free memory, and/or the like). Data processing logic 120 may access data in database 142 using one of a plurality of data access modes determined by dynamic data access mode logic 122. Non-limiting examples of data access modes may include a high-utilization data access mode and a low-utilization data access mode.

In various embodiments, dynamic data access mode logic 122 may operate to monitor the utilization of database 142 and to determine a data access mode. Utilization may be based on various utilization factors, such as hit position, free memory or entries, and/or the like. Dynamic data access mode logic 122 may compare the utilization with one or more thresholds. If the utilization of the database is below a low threshold, the data access process may use a low-utilization data access mode, and if the utilization is above a high threshold, the data access may use a high-utilization data access mode. In exemplary embodiments, the low threshold and the high threshold may have different values (see, for example, FIG. 4). In various embodiments, the first threshold and the second threshold may have the same value (for instance, dynamic data access mode logic 122 uses only one threshold). In various embodiments, the first threshold and/or the second threshold may be determined by an operator, determined automatically via test software, and/or a combination thereof.

Dynamic data access mode logic 122 may set an active data access mode based on the database information. The active data access mode may be specified in various data structures or objects, such as a register, variable, data field, packet, message, signal, and/or the like. When interacting with database 142, data processing logic 120 may check the active data access mode and perform data operations using the active data access mode. In some embodiments, the data processing logic 120 may check the active data access mode on each or substantially each operation. In other embodiments, data processing logic 120 may check the active data access mode based on a specified event, such as number of instructions, expiry of a timer, efficiency threshold, and/or the like. In various embodiments, dynamic data access mode logic 122 may set a bit, variable, register, and/or the like or send a signal responsive to a change in the data access mode to alert data processing logic 120 alerting that a change has occurred. In some embodiments, a bit, variable, register, and/or the like may be used as a "dirty bit" to indicate that a mode change has occurred. In such embodiments, data processing logic 120 and/or dynamic data access mode logic 122 may reset the bit after the mode change has been implemented.

Figure 2:
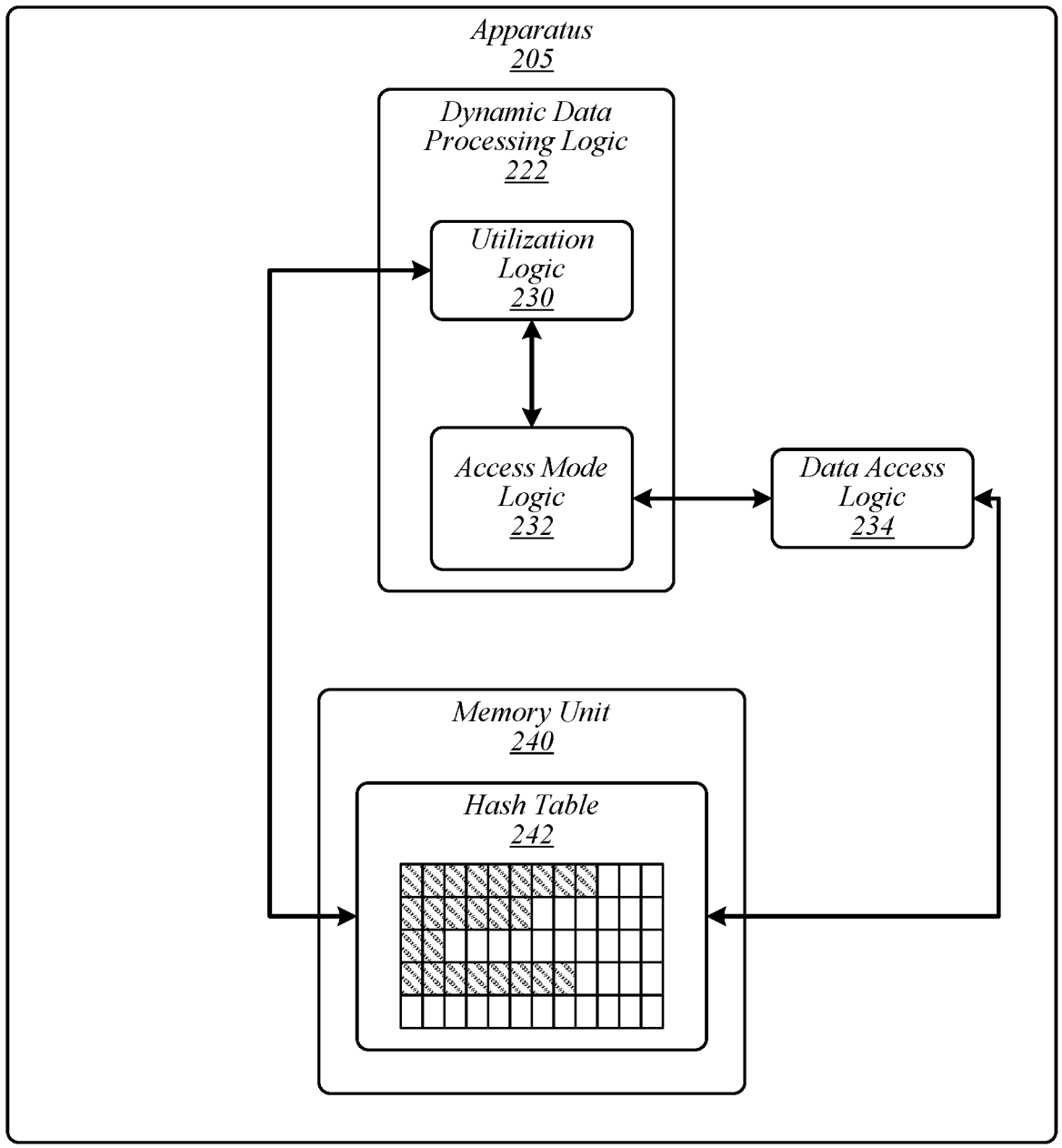
FIG. 2 illustrates an embodiment of a second operating environment.

FIG. 2 illustrates an example of an operating environment 200 that may be representative of various embodiments. The operating environment 200 depicted in FIG. 2 may include an apparatus 205 having a memory unit 240 storing a hash table 242. Dynamic data processing logic 222 may include utilization logic 230 operative to monitor 260 utilization of hash table 242. In some embodiments, utilization logic 230 may determine a utilization value associated with hash table 242 indicating a fullness level of hash table. In some embodiments, the utilization value may include a number, percentage, or other measure of empty entries of hash table 242.

In various hash table applications according to some embodiments (for example, Open vSwitch (OvS) MegaFlow tables, such as Open vSwitch Release 2.9.2), entries may be periodically deleted (or marked invalid) when inactive, and new entries may be added in the first valid position that is found in each bucket. Accordingly, the valid entries in a bucket are congregated toward the beginning of each bucket. In such embodiments, monitoring hash table utilization may include using an average "hit position" (HP) to sample which entries are actively hit. The hit position may be recorded, for instance, in a register, bit, variable, packet, table, and/or the like). In exemplary embodiments, the hit position may be determined for each or substantially each operation or type of operation on hash table 242. In various embodiments, the hit position may be sampled based on sampling criteria, such as expiry of a time period, a set number of operations (for example, at each N lookup), and/or the like.

In various embodiments, in order to observe the real time utilization, and filter out old information, a low overhead Exponential Weighted Moving Average Filter (EWMA) may be used to maintain the hit position. In general, EWMA may give more weight to recent samples and less weight to data as they become older in time. The following equation (1) provides an illustrative process for determining a hit position using EWMA:

$$HP\_new = \alpha * HP\_old + (1-\alpha) * HP\_sample.$$

In equation (1), the new average hit position is equal to the recently sampled average hit position times $(1-\alpha)$, plus the last average hit position times $\alpha$. In general, equation (1) allows for the effective capture of average utilization (or load factor) over time.

In some embodiments, the value of $\alpha$ (weight factor) may be determined to give more or less weight to older hit positions. For example, $\alpha$ could be a value such as 0.2 to give less weight to the old average hit position. The weight factor α may have various values, including, without limitation, about 0.0, about 0.1, about 0.2, about 0.3, about 0.4, about 0.5, about 0.6, about 0.7, about 0.8, about 0.9, and 1.0, and any value or range between any two of these values (including endpoints). The smaller the hit position (for example, on average), the lower the utilization. For example, if the average hit position is 1, most of the time the target is found in the first entry. In such cases, horizontal vectorization wastes a lot of vector lanes and the data access mode should switch to a low-utilization data access mode (for instance, either scalar mode or vertical vectorization mode).

Figure 3:
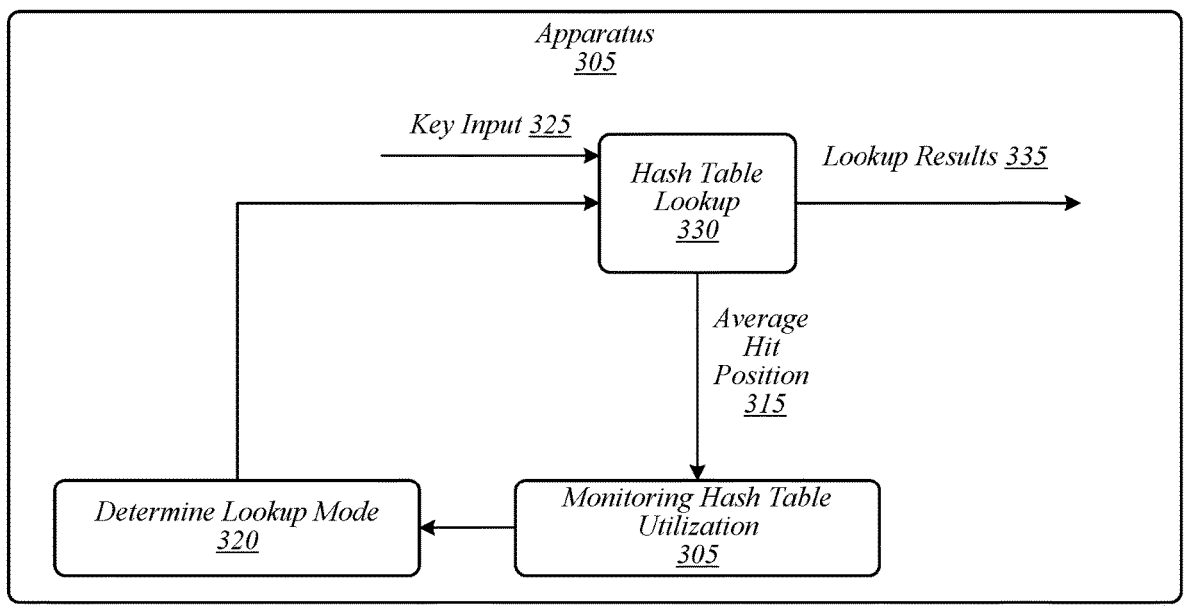
FIG. 3 illustrates an embodiment of a third operating environment.

Referring to FIG. 3, therein is illustrated an example of an operating environment 300 that may be representative of various embodiments. In particular, FIG. 3 depicts an operating environment 300 that uses an average hit position utilization value. As shown in FIG. 3, an apparatus 305 may be configured to perform monitoring of hash table utilization 305 in the form of an average hit position 315 of a hash table. Average hit position 315 may be used to determine a lookup mode 320. A hash table lookup logic 300 may receive key input 325 and the data access mode for the operation to perform a hash table lookup and provide lookup results 335 to a requestor.

Figure 4:
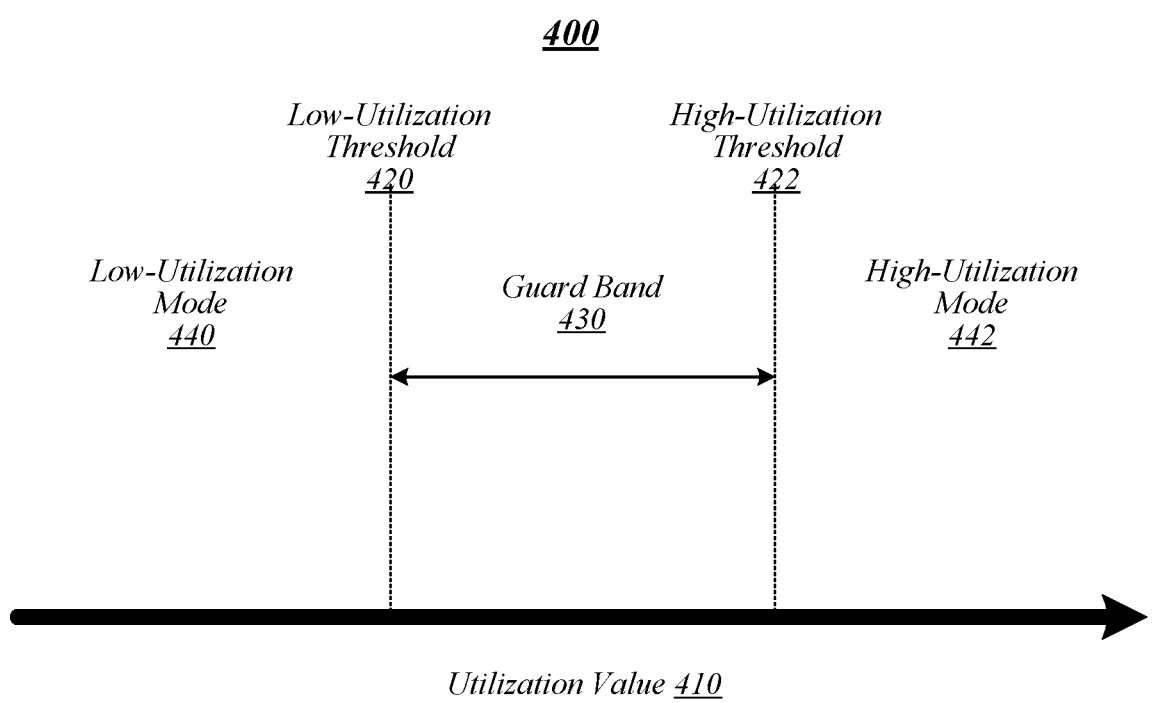
FIG. 4 illustrates an embodiment of a fourth operating environment.

Utilization logic 230 may determine a utilization value according to some embodiments and provide the utilization value to access mode logic 232. In various embodiments, access mode logic 232 may determine an active access mode based on a comparison of the utilization value to one or more thresholds. Referring to FIG. 4, therein is illustrated a graphical representation of determining an active access mode according to some embodiments. As shown in FIG. 4, a utilization value 410 may be compared to a low-utilization threshold 420 and a high-utilization threshold 422. If utilization value 410 is within a guard band 430 that is below high-utilization threshold 422 and above low-utilization threshold 420, the active data access mode is maintained, for example, to prevent oscillating or thrashing. If the utilization value 410 is below the low-utilization threshold 420, the active data access mode is set to low-utilization mode 440. If the utilization value 410 is above the high-utilization threshold 422, the active data access mode is set to high-utilization mode 442.

The value of the low-utilization threshold 420 and a high-utilization threshold 422 may be determined based on the type of utilization value. For example, thresholds may be specified in terms of hit position for a hit position utilization value. In some embodiments, a hit-position based threshold may be determined based on the number of positions, entries, buckets, and/or the like (for instance, the first X % of positions). For example, low-utilization threshold 420 may be set for the first 1%, 5%, 10%, 20%, or any value or range between any two of these values (including endpoints) of buckets, and high-utilization threshold 420 may be set for 30%, 40%, 50%, 60%, 70%, 80%, 90%, 100% or any value or range between any two of these values (including endpoints) of buckets. Accordingly, for a hash table with 8 buckets to be considered and a 10% setting, the low-utilization threshold may be 1 (for instance, 0.8 rounded up to 1). In some embodiments, for a hit-position utilization value, low-utilization threshold 420 may be a value less than 4 (for instance, 1 or 2). In various embodiments, utilization value 410 may be based on a percentage of used memory, buckets, entries, and/or the like. In such embodiments, low-utilization threshold 420 may be set for the 1%, 5%, 10%, 20%, 30%, or any value or range between any two of these values (including endpoints) of database usage, and high-utilization threshold 420 may be set for 30%, 40%, 50%, 60%, 70%, 80%, 90%, 100% or any value or range between any two of these values (including endpoints) of database usage. Embodiments are not limited in this context.

Referring to FIG. 2, access mode logic 232 may set the active access mode. Data access logic 234 may receive the active access mode, for instance, as a signal or value from access mode logic or by checking an active access mode bit, register, variable, packet, and/or the like. For example, if an active access mode variable has a value of 1, the active access mode is scalar, if the active access mode variable has a value of 2, the active access mode is vertical vectorization, and if the active access mode variable has a value of 3, the active access mode is horizontal vectorization. Data access logic 234 may perform an operation on hash table 242 according to the active access mode.

In some embodiments, active entries (ways) may be congregated toward the beginning of a bucket. However, in certain implementations, inactive entries may not be proactively deleted. In such cases, for example, the hash table may rely on eviction policies to kick out an entry during insertion when the bucket is full. Random eviction is an exemplary eviction policy. In such cases, new and active entries are not necessarily added toward the beginning of the buckets. Over time they could be randomly dispersed over available ways among a bucket. Another possible cause of the dispersed distribution of active entries may occur when an entry is added, the only available position may not be at the beginning of the bucket. Over time, the entries toward the beginning become invalid, but the later added entry may still active. Accordingly, although the active entries in one or more buckets may be very few, the hit position could potentially be anywhere.

Accordingly, some embodiments may use or include a compression process operative to move all or substantially all active entries toward the beginning of a unit data structure. In some embodiments, the unit data structure may include a bucket of a hash table, a row, a table, and/or the like. Therefore, when the number of active entries per bucket is small, the active entries may be periodically (for instance, based on expiry of a timer, a specified number of operations, and/or the like) moved toward the beginning so that monitoring according to some embodiments may be efficient and accurate.

For example, to minimize the overhead, a small number of sample buckets may be observed for active entry distribution. For instance, a small number of sample sets in a cache (which is essentially a hash table) may reflect the behavior of the whole cache. For each sampled bucket, the hit counters may be observed for each way. For majority of sample sets, if the hits are concentrated in a very small number of entries (for instance, hit entries may mostly be dispersed across the bucket), this may indicate that the number of total active ways are very small.

Figure 5:
FIG. 5 illustrates an embodiment of a fifth operating environment.

Referring to FIG. 5, therein is illustrated an example sampling process according to some embodiments. FIG. 5 depicts a sample set 510 with a plurality of ways 520-527, showing hit counters 530-537 for each $n^{th}$ way. Sample set 510 may include sample set counters over an overserving window. The example of FIG. 5 indicates that there is only one active entry on way 3 522. In some embodiments, if a majority of sample sets indicate low load, the hash table load (utilization) is low.

When low utilization is indicated, for example, by a small number of active ways, is detected, we then periodically move all active entries toward the beginning of the hash table. For example, AVX instructions (for instance, AVX permute) may be used to make the move more efficient. Accordingly, active entries may be congregated toward the beginning to facilitate the determination of database utilization according to some embodiments.

Figure 6:
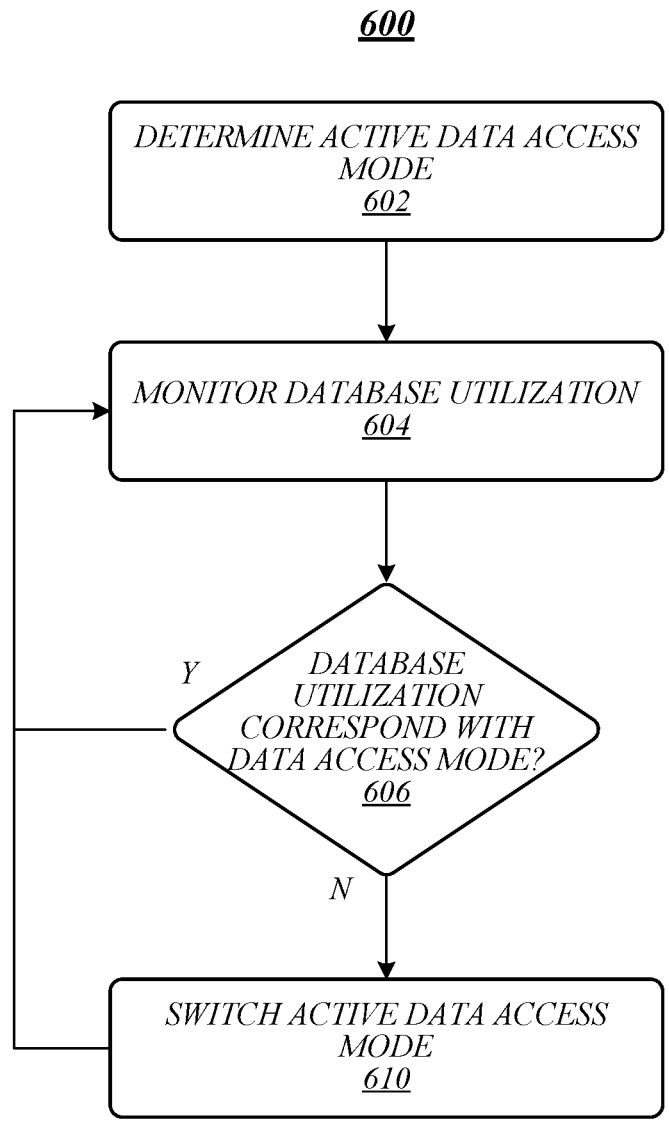
FIG. 6 illustrates an embodiment of a first logic flow.

FIG. 6 illustrates an embodiment of a logic flow 600. Logic flow 600 may be representative of some or all of the operations executed by one or more embodiments described herein, such as apparatus 105, 205, and/or 305. In some embodiments, logic flow 500 may be representative of some or all of the operations of activating a data access mode.

Logic flow 600 may determine an active data access mode at block 602. For example, a default data access mode may include a high-utilization data access mode, such as horizontal vectorization. In another example, dynamic data access mode logic 122 may use a bit, variable, register, and/or the like to indicate an active data access mode. At block 604, logic flow 600 may monitor database utilization. For example, dynamic data processing logic 222 may include utilization logic 230 operative to monitor 260 utilization of hash table 242. In some embodiments, utilization logic 230 may determine a utilization value associated with hash table 242 indicating a fullness level of hash table. In some embodiments, the utilization value may include a number, percentage, or other measure of empty entries of hash table 242. Database utilization may be based on, among other things, a hit position, portion of used database (or memory), and/or the like.

Logic flow 600 may determine whether database utilization corresponds with the data access mode at block 608. For example, a utilization value 410 may be compared to a low-utilization threshold 420 and a high-utilization threshold 422. If utilization value 410 is within a guard band 430 that is below high-utilization threshold 422 and above low-utilization threshold 420, the active data access mode is maintained, for example, to prevent oscillating or thrashing.

If the database utilization corresponds with the data access mode at block 608, logic flow 600 may maintain the active data access mode and continue monitoring. If the database utilization does not correspond with the data access mode at block 608, logic flow 600 may switch the active data access mode at block 610. For example, if the utilization value 410 is below the low-utilization threshold 420, the active data access mode is set to low-utilization mode 440; if the utilization value 410 is above the high-utilization threshold 422, the active data access mode is set to high-utilization mode 442.

Experiment: 8-Way Hash Table

Vertical vectorization (low-utilization data access mode), scalar (low-utilization data access mode), and vectorization (for instance, high-utilization data access mode) were tested with an 8-way hash table provided by the DPDK library. For the input keys that miss on the first round of lookup (comparing with the first entries of all corresponding buckets), a second round of lookup with second entries was conducted.

The performance of the three modes was compared on an Intel® Broadwell server (for example, E5 2699 v4, 2.2G Hz, 22 cores). DPDK's test benchmark was used to test the performance of different modes. The results are depicted in graph 705 of FIG. 7 for scalar, vertical vectorization ("vert"), and horizontal vectorization ("hori"). The x-axis of Graph 705 is the average location that a matching key is found in a bucket, which may indicate how full the hash table is. Graph 705 depicts that when the utilization is high, horizontal vectorization performs the best (for instance, 2× less cycle count than scalar). When utilization is low or very low, vertical vectorization and scalar mode start to perform better than the horizontal mode.

Figure 8:
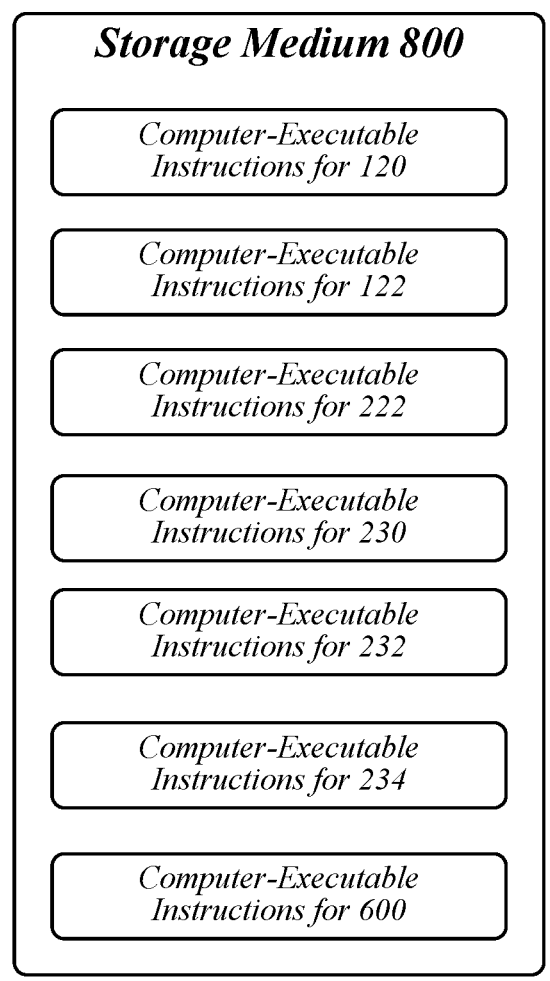
FIG. 8 illustrates an example of a storage medium.

FIG. 8 illustrates an example of a storage medium 800. Storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions to implement logic flow 600 and/or logics 120, 122, 222, 230, 232, and/or 234. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
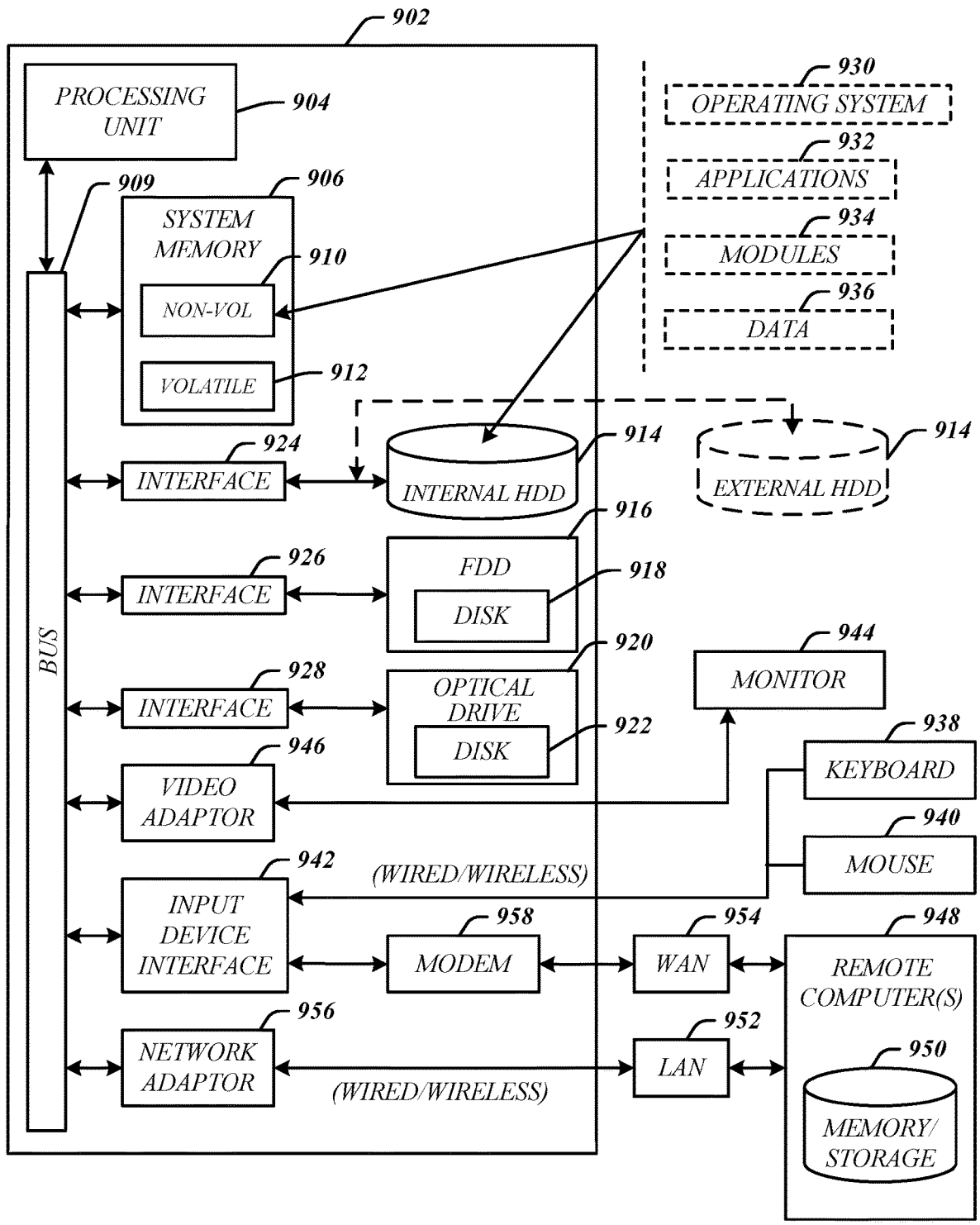
FIG. 9 illustrates an embodiment of a computing architecture.

FIG. 9 illustrates an embodiment of an exemplary computing architecture 900 suitable for implementing various embodiments as previously described. In various embodiments, the computing architecture 900 may comprise or be implemented as part of an electronic device. In some embodiments, the computing architecture 900 may be representative, for example, of apparatus 105, 205, and/or 305. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1384 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of apparatus 105, 205, and/or 305.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1384 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following are non-limiting examples according to some embodiments:

Example 1 is an apparatus that may include a processor, and at least one memory coupled to the processor, the at least one memory comprising an indication of a database and instructions, the instructions, when executed by the processor, to cause the processor to determine a database utilization value for a database, perform a comparison of the database utilization value to at least one utilization threshold, and set an active data access mode to one of a low-utilization data access mode or a high-utilization data access mode based on the comparison.

Example 2 is the apparatus of Example 1, wherein the memory comprises the database.

Example 3 is the apparatus of Example 1, where the indication of the database points to a database accessible via a network.

Example 4 is the apparatus of Example 1, wherein the database comprises a hash table.

Example 5 is the apparatus of Example 1, wherein the database utilization value comprises a hit position.

Example 6 is the apparatus of Example 1, wherein the database utilization value comprises a percentage of use of the database.

Example 7 is the apparatus of Example 1, wherein the database utilization value comprises one of a hit position or a percentage of use of the database.

Example 8 is the apparatus of Example 1, wherein the low-utilization data access mode comprises a scalar data access mode.

Example 9 is the apparatus of Example 1, wherein the low-utilization data access mode comprises a vertical vectorization data access mode.

Example 10 is the apparatus of Example 1, wherein the low-utilization data access mode comprises one of a scalar data access mode or a vertical vectorization data access mode.

Example 11 is the apparatus of Example 1, wherein the high-utilization data access mode comprises a horizontal vectorization data access mode.

Example 12 is the apparatus of Example 1, wherein the at least one utilization threshold comprises a low-utilization threshold and a high-utilization threshold.

Example 13 is the apparatus of Example 1, wherein the at least one utilization threshold comprises a low-utilization threshold and a high-utilization threshold, the logic to set the active data access mode to the low-utilization data access mode responsive to the database utilization value being greater than the low-utilization threshold.

Example 14 is the apparatus of Example 1, wherein the at least one utilization threshold comprises a low-utilization threshold and a high-utilization threshold, the logic to set the active data access mode to the high-utilization data access mode responsive to the database utilization value being greater than the high-utilization threshold.

Example 15 is the apparatus of Example 1, the logic to compress active entries in the database toward the beginning of a unit data structure of the database.

Example 16 is the apparatus of Example 1, the logic to determine the database utilization value to weight recent samples over older samples.

Example 17 is a system, comprising the apparatus according to any of Examples 1-16, and at least one network interface.

Example 18 is a method, comprising determining a database utilization value for a database, performing a comparison of the database utilization value to at least one utilization threshold, and setting an active data access mode to one of a low-utilization data access mode or a high-utilization data access mode based on the comparison.

Example 19 is the method of Example 18, wherein the database comprises a hash table.

Example 20 is the method of Example 18, wherein the database utilization value comprises a hit position.

Example 21 is the method of Example 18, wherein the database utilization value comprises a percentage of use of the database.

Example 22 is the method of Example 18, wherein the database utilization value comprises one of a hit position or a percentage of use of the database.

Example 23 is the method of Example 18, wherein the low-utilization data access mode comprises a scalar data access mode.

Example 24 is the method of Example 18, wherein the low-utilization data access mode comprises a vertical vectorization data access mode.

Example 25 is the method of Example 18, wherein the low-utilization data access mode comprises one of a scalar data access mode or a vertical vectorization data access mode.

Example 26 is the method of Example 18, wherein the high-utilization data access mode comprises a horizontal vectorization data access mode.

Example 27 is the method of Example 18, wherein the at least one utilization threshold comprises a low-utilization threshold and a high-utilization threshold.

Example 28 is the method of Example 18, wherein the at least one utilization threshold comprises a low-utilization threshold and a high-utilization threshold, comprising setting the active data access mode to the low-utilization data access mode responsive to the database utilization value being greater than the low-utilization threshold.

Example 29 is the method of Example 18, wherein the at least one utilization threshold comprises a low-utilization threshold and a high-utilization threshold, comprising setting the active data access mode to the high-utilization data access mode responsive to the database utilization value being greater than the high-utilization threshold.

Example 30 is the method of Example 18, comprising compressing active entries in the database toward the beginning of a unit data structure of the database.

Example 31 is the method of Example 18, comprising determining the database utilization value to weight recent samples over older samples.

Example 32 is a non-transitory computer-readable storage medium that stores computer-executable instructions for execution by processing circuitry of a computing device, the computer-executable instructions, when executed, to cause the computing device to determine a database utilization value for a database, perform a comparison of the database utilization value to at least one utilization threshold, and set an active data access mode to one of a low-utilization data access mode or a high-utilization data access mode based on the comparison.

Example 33 is the non-transitory computer-readable storage medium of Example 32, wherein the database comprises a hash table.

Example 34 is the non-transitory computer-readable storage medium of Example 32, wherein the database utilization value comprises a hit position.

Example 35 is the non-transitory computer-readable storage medium of Example 32, wherein the database utilization value comprises a percentage of use of the database.

Example 36 is the non-transitory computer-readable storage medium of Example 32, wherein the database utilization value comprises one of a hit position or a percentage of use of the database.

Example 37 is the non-transitory computer-readable storage medium of Example 32, wherein the low-utilization data access mode comprises a scalar data access mode.

Example 38 is the non-transitory computer-readable storage medium of Example 32, wherein the low-utilization data access mode comprises a vertical vectorization data access mode.

Example 39 is the non-transitory computer-readable storage medium of Example 32, wherein the low-utilization data access mode comprises one of a scalar data access mode or a vertical vectorization data access mode.

Example 40 is the non-transitory computer-readable storage medium of Example 32, wherein the high-utilization data access mode comprises a horizontal vectorization data access mode.

Example 41 is the non-transitory computer-readable storage medium of Example 32, wherein the at least one utilization threshold comprises a low-utilization threshold and a high-utilization threshold.

Example 42 is the non-transitory computer-readable storage medium of Example 32, wherein the at least one utilization threshold comprises a low-utilization threshold and a high-utilization threshold, the computer-executable instructions, when executed, to cause the computing device to set the active data access mode to the low-utilization data access mode responsive to the database utilization value being greater than the low-utilization threshold.

Example 43 is the non-transitory computer-readable storage medium of Example 32, wherein the at least one utilization threshold comprises a low-utilization threshold and a high-utilization threshold, the computer-executable instructions, when executed, to cause the computing device to set the active data access mode to the high-utilization data access mode responsive to the database utilization value being greater than the high-utilization threshold.

Example 44 is the non-transitory computer-readable storage medium of Example 32, the computer-executable instructions, when executed, to cause the computing device to compress active entries in the database toward the beginning of a unit data structure of the database.

Example 45 is the non-transitory computer-readable storage medium of Example 32, the computer-executable instructions, when executed, to cause the computing device to determine the database utilization value to weight recent samples over older samples.

Example 46 is an apparatus, comprising a database utilization means to determine a database utilization value for a database, a comparison means to perform a comparison of the database utilization value to at least one utilization threshold, and a data access mode means to set an active data access mode to one of a low-utilization data access mode or a high-utilization data access mode based on the comparison.

Example 47 is the apparatus of Example 46, wherein the database comprises a hash table.

Example 48 is the apparatus of Example 46, wherein the database utilization value comprises a hit position.

Example 49 is the apparatus of Example 46, wherein the database utilization value comprises a percentage of use of the database.

Example 50 is the apparatus of Example 46, wherein the database utilization value comprises one of a hit position or a percentage of use of the database.

Example 51 is the apparatus of Example 46, wherein the low-utilization data access mode comprises a scalar data access mode.

Example 52 is the apparatus of Example 46, wherein the low-utilization data access mode comprises a vertical vectorization data access mode.

Example 53 is the apparatus of Example 46, wherein the low-utilization data access mode comprises one of a scalar data access mode or a vertical vectorization data access mode.

Example 54 is the apparatus of Example 46, wherein the high-utilization data access mode comprises a horizontal vectorization data access mode.

Example 55 is the apparatus of Example 46, wherein the at least one utilization threshold comprises a low-utilization threshold and a high-utilization threshold.

Example 56 is the apparatus of Example 46, wherein the at least one utilization threshold comprises a low-utilization threshold and a high-utilization threshold, the data access mode means to set the active data access mode to the low-utilization data access mode responsive to the database utilization value being greater than the low-utilization threshold.

Example 57 is the apparatus of Example 46, wherein the at least one utilization threshold comprises a low-utilization threshold and a high-utilization threshold, the data access mode means to set the active data access mode to the high-utilization data access mode responsive to the database utilization value being greater than the high-utilization threshold.

Example 58 is the apparatus of Example 46, comprising a data compression means to compress active entries in the database toward the beginning of a unit data structure of the database.

Example 59 is the apparatus of Example 46, the database utilization means to determine the database utilization value to weight recent samples over older samples.

Example 60 is a system, comprising the apparatus according to any of Examples 46-59, and at least one network interface.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   processor circuitry; and
   at least one memory coupled to the processor circuitry, the at least one memory comprising an indication of a database and instructions, the instructions, when executed by the processor circuitry, to cause the processor circuitry to:
   determine a database utilization value for the database,
   perform a comparison of the database utilization value to at least one utilization threshold, and
   dynamically set an active data access mode to one of a low-utilization data access mode or a high-utilization data access mode based on the comparison to optimize data access performance, the low-utilization data access mode to comprise singular processing and the high-utilization data access mode to comprise parallel processing;
   wherein the at least one utilization threshold comprises a low-utilization threshold and a high-utilization threshold, the processor circuitry to set the active data access mode to the low-utilization data access mode responsive to the database utilization value being greater than the low-utilization threshold, and set the active data access mode to the high-utilization data access mode responsive to the database utilization value being greater than the high-utilization threshold.

2. The apparatus of claim 1, wherein the database comprises a hash table.

3. The apparatus of claim 1, wherein the database utilization value comprises one of a hit position or a percentage of use of the database.

4. The apparatus of claim 1, wherein the low-utilization data access mode comprises one of a scalar data access mode or a vertical vectorization data access mode.

5. The apparatus of claim 1, wherein the high-utilization data access mode comprises a horizontal vectorization data access mode.

6. The apparatus of claim 1, the processor circuitry to compress active entries in the database toward a beginning of a unit data structure of the database.

7. The apparatus of claim 1, the processor circuitry to determine the database utilization value to weight recent samples over older samples.

8. A method, comprising:
   determining a database utilization value for a database;
   performing a comparison of the database utilization value to at least one utilization threshold; and
   dynamically setting an active data access mode to one of a low-utilization data access mode or a high-utilization data access mode based on the comparison to optimize data access performance, the low-utilization data access mode to comprise singular processing and the high-utilization data access mode to comprise parallel processing, the low-utilization data access mode and the high-utilization data access mode to have different efficiencies based on time, cycles or memory usage of a device;
   wherein the at least one utilization threshold comprises a low-utilization threshold and a high-utilization threshold, and setting the active data access mode to the low-utilization data access mode responsive to the database utilization value being greater than the low-utilization threshold, and setting the active data access mode to the high-utilization data access mode responsive to the database utilization value being greater than the high-utilization threshold.

9. The method of claim 8, wherein the database comprises a hash table.

10. The method of claim 8, wherein the database utilization value comprises one of a hit position or a percentage of use of the database.

11. The method of claim 8, wherein the low-utilization data access mode comprises one of a scalar data access mode or a vertical vectorization data access mode.

12. The method of claim 8, wherein the high-utilization data access mode comprises a horizontal vectorization data access mode.

13. The method of claim 8, comprising compressing active entries in the database toward a beginning of a unit data structure of the database.

14. The method of claim 8, comprising determining the database utilization value to weight recent samples over older samples.

15. A non-transitory computer-readable storage medium that stores computer-executable instructions for execution by processing circuitry of a computing device, the computer-executable instructions, when executed, to cause the computing device to:
- determine a database utilization value for a database;
- perform a comparison of the database utilization value to at least one utilization threshold; and
- dynamically set an active data access mode to one of a low-utilization data access mode or a high-utilization data access mode based on the comparison to optimize data access performance, the low-utilization data access mode to comprise singular processing and the high-utilization data access mode to comprise parallel processing, the low-utilization data access mode and the high-utilization data access mode to have different efficiencies based on time, cycles or memory usage of a device;
- wherein the at least one utilization threshold comprises a low-utilization threshold and a high-utilization threshold, and set the active data access mode to the low-utilization data access mode responsive to the database utilization value being greater than the low-utilization threshold, and set the active data access mode to the high-utilization data access mode responsive to the database utilization value being greater than the high-utilization threshold.

16. The non-transitory computer-readable storage medium of claim 15, wherein the database utilization value comprises one of a hit position or a percentage of use of the database.

17. The non-transitory computer-readable storage medium of claim 15, wherein the low-utilization data access mode comprises one of a scalar data access mode or a vertical vectorization data access mode.

18. The non-transitory computer-readable storage medium of claim 15, wherein the high-utilization data access mode comprises a horizontal vectorization data access mode.

* * * * *